US009405253B2

(12) United States Patent
Sugiura et al.

(10) Patent No.: US 9,405,253 B2
(45) Date of Patent: Aug. 2, 2016

(54) IMAGE FORMING SYSTEM AND COMPUTER-READABLE RECORDING MEDIUM

(75) Inventors: Hiroshi Sugiura, Toyokawa (JP); Yoichi Kurumasa, Toyokawa (JP); Tomokazu Kato, Toyokawa (JP); Yusaku Tanaka, Toyokawa (JP); Yoshiyuki Tamai, Toyohashi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 528 days.

(21) Appl. No.: 13/315,540

(22) Filed: Dec. 9, 2011

(65) Prior Publication Data

US 2012/0154841 A1 Jun. 21, 2012

(30) Foreign Application Priority Data

Dec. 16, 2010 (JP) ................................. 2010-280097

(51) Int. Cl.
*G03G 15/00* (2006.01)
*G06F 3/12* (2006.01)

(52) U.S. Cl.
CPC .................................... *G03G 15/502* (2013.01)

(58) Field of Classification Search
None
See application file for complete search history.

(56) References Cited

U.S. PATENT DOCUMENTS 6,902,114 B2 * 6/2005 Hashimoto et al. ...... 235/462.25
7,062,190 B2 * 6/2006 Miyamoto ...................... 399/81
7,949,956 B2 5/2011 Imai et al.
2001/0028808 A1 10/2001 Nomura et al.
2003/0058473 A1 * 3/2003 Hosokawa et al. .......... 358/1.18
2003/0142348 A1 * 7/2003 Hiramatsu et al. ........... 358/1.15
2006/0023247 A1 * 2/2006 Yamakawa .................. 358/1.14
2006/0187483 A1 * 8/2006 Baba ............................ 358/1.15
2006/0274347 A1 12/2006 Mori
2007/0046973 A1 * 3/2007 Toda ............................ 358/1.13

(Continued)

FOREIGN PATENT DOCUMENTS

JP 2001-245082 A 9/2001
JP 2004-056377 A 2/2004

(Continued)

OTHER PUBLICATIONS

Windows XP documentation<https://www.microsoft.com/resources/documentation/windows/xp/all/proddocs/enus/win_tray_window_change_size.mspx?mfr=true> dated Oct. 23, 2007.*

(Continued)

*Primary Examiner* — Ming Hon
(74) *Attorney, Agent, or Firm* — Buchanan Ingersoll & Rooney PC

(57) ABSTRACT

An image forming system includes an input control part and a display control part. The input control part receives an operation input from a user. The display control part selectively displays a setting screen for mode setting and a job list screen displaying a list of jobs. In more detail, the display control part displays the job list screen on the display part when a first instruction which is a display instruction for the job list screen is received during a setting operation period for mode setting. Further, the display control part hides the job list screen and displays an information display screen relating to an operation which is performed during the setting operation period, on the display part, when a second instruction which is a non-display instruction for the job list screen is received while the job list screen is being displayed.

16 Claims, 17 Drawing Sheets

(56) References Cited

U.S. PATENT DOCUMENTS

2008/0240766 A1* 10/2008 Sugihara ............ G03G 15/5016
399/81
2009/0009803 A1 1/2009 Takeuchi et al.
2009/0195819 A1 8/2009 Sugimoto et al.
2011/0026055 A1* 2/2011 Sato ................................ 358/1.9

FOREIGN PATENT DOCUMENTS

JP 2006-323504 A 11/2006
JP 2009-015171 A 1/2009
JP 2009-037017 A 2/2009
JP 2009-188589 A 8/2009

OTHER PUBLICATIONS

Office Action (Notice of Reasons for Refusal) dated Dec. 4, 2012, issued in corresponding Japanese Patent Application No. 2010-280097, and an English Translation thereof. (7 pages).

* cited by examiner

*Fig.4*

TB1

| No | SET ITEM | DISPLAY | CHANGE OF SETTINGS | SETTING DETAILS |
|---|---|---|---|---|
| 1 | COLOR | YES | YES | FULL COLOR |
| 2 | PAPER | YES | NO | AUTO |
| 3 | DUPLEX/COMBINE | YES | YES | 1-SIDED > 1-SIDED / 2 IN 1 |
| 4 | FINISHING | YES | BEING SET | STAPLE OFF |

Fig. 16

TB2

| No | SET ITEM | CHANGE OF SETTINGS | SETTING DETAILS |
|---|---|---|---|
| 1 | COLOR | YES | FULL COLOR |
| 2 | DUPLEX/COMBINE | YES | 1-SIDED > 1-SIDED / 2 IN 1 |

IMAGE FORMING SYSTEM AND COMPUTER-READABLE RECORDING MEDIUM

This application is based on Japanese Patent Application No. 2010-280097 filed on Dec. 16, 2010, the contents of which are hereby incorporated by reference.

BACKGROUND OF THE INVENTION

1. Field of the Invention

The present invention relates to an image forming system and a technique relevant to the same.

2. Description of the Background Art

Some of image forming apparatuses are each equipped with a display part (operation panel or the like) and display various screens thereon. In a display part (such as a liquid crystal display part or the like) of an image forming apparatus disclosed in Japanese Patent Application Laid Open Gazette No. 2009-37017, for example, provided are two exclusive partial areas, i.e., one partial area relating to a setting screen for mode setting and the other partial area relating to a job list screen or the like.

In the image forming apparatus disclosed in Japanese Patent Application Laid Open Gazette No. 2009-37017, however, the setting screen for mode setting can be displayed only in the one partial area and the job list screen or the like can be displayed only in the other partial area. In other words, the display of the setting screen for mode setting is performed restrictively in the one partial area of the display part and the display of the job list screen or the like is performed restrictively in the other partial area of the display part. Thus, in the technique disclosed in Japanese Patent Application Laid Open Gazette No. 2009-37017, the display part cannot be used efficiently.

SUMMARY OF THE INVENTION

It is an object of the present invention to provide an image forming system capable of using a display part efficiently and a technique relevant to the same.

The present invention is intended for an image forming system. According to the present invention, the image forming system comprises an input control part for receiving an operation input from a user, and a display control part for selectively displaying a setting screen for mode setting and a job list screen displaying a list of jobs, on a display part in response to the operation input, and in the image forming system of the present invention, the display control part displays the job list screen on the display part when a first instruction which is a display instruction for the job list screen is received during a setting operation period for mode setting, and the display control part hides the job list screen and displays an information display screen relating to an operation which is performed during the setting operation period, on the display part, when a second instruction which is a non-display instruction for the job list screen is received while the job list screen is being displayed.

The present invention is also intended for a non-transitory computer-readable recording medium. According to the present invention, the non-transitory computer-readable recording medium records therein a computer program for causing a computer to serve as a device comprising an input control part for receiving an operation input from a user, and a display control part for selectively displaying a setting screen for mode setting in an image forming system and a job list screen displaying a list of jobs of the image forming system, on a display part in response to the operation input, and in the image forming system, the display control part displays the job list screen on the display part when a display instruction for the job list screen is received during a setting operation period for mode setting, and the display control part hides the job list screen and displays an information display screen relating to operation items in a setting operation on the display part when a non-display instruction for the job list screen is received while the job list screen is being displayed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing operation history information data;

FIG. 16 is a view showing operation history information data in accordance with the variation;

DESCRIPTION OF THE PREFERRED EMBODIMENTS

Hereinafter, the preferred embodiments of the present invention will be discussed with reference to the accompanying drawings.

1. The First Preferred Embodiment

1-1. Constitution

Figure 1:
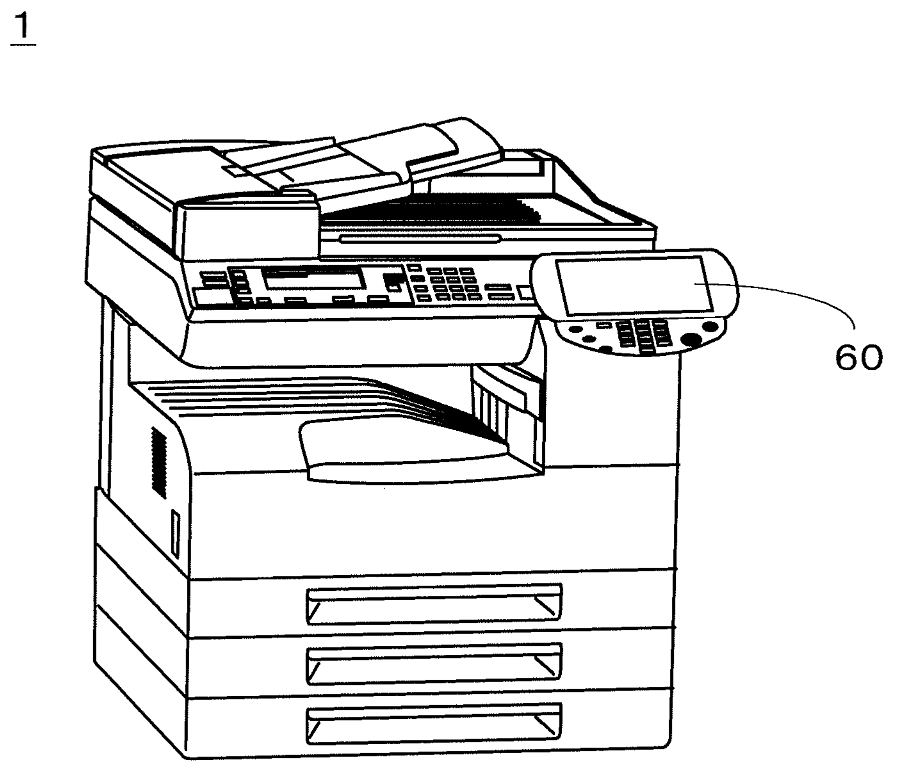
FIG. 1 is a view showing a schematic configuration of an image forming apparatus in accordance with a first preferred embodiment.

FIG. 1 is a schematic view showing an appearance of an image forming apparatus 1 in accordance with the present invention. Herein, the image forming apparatus 1 is configured as a Multi Function Peripheral (abbreviated as "MFP"). The MFP is an apparatus (also referred to as a "multifunction machine") comprising a scanner function, a printer function, a copy function, a facsimile communication function and the like.

Figure 2:
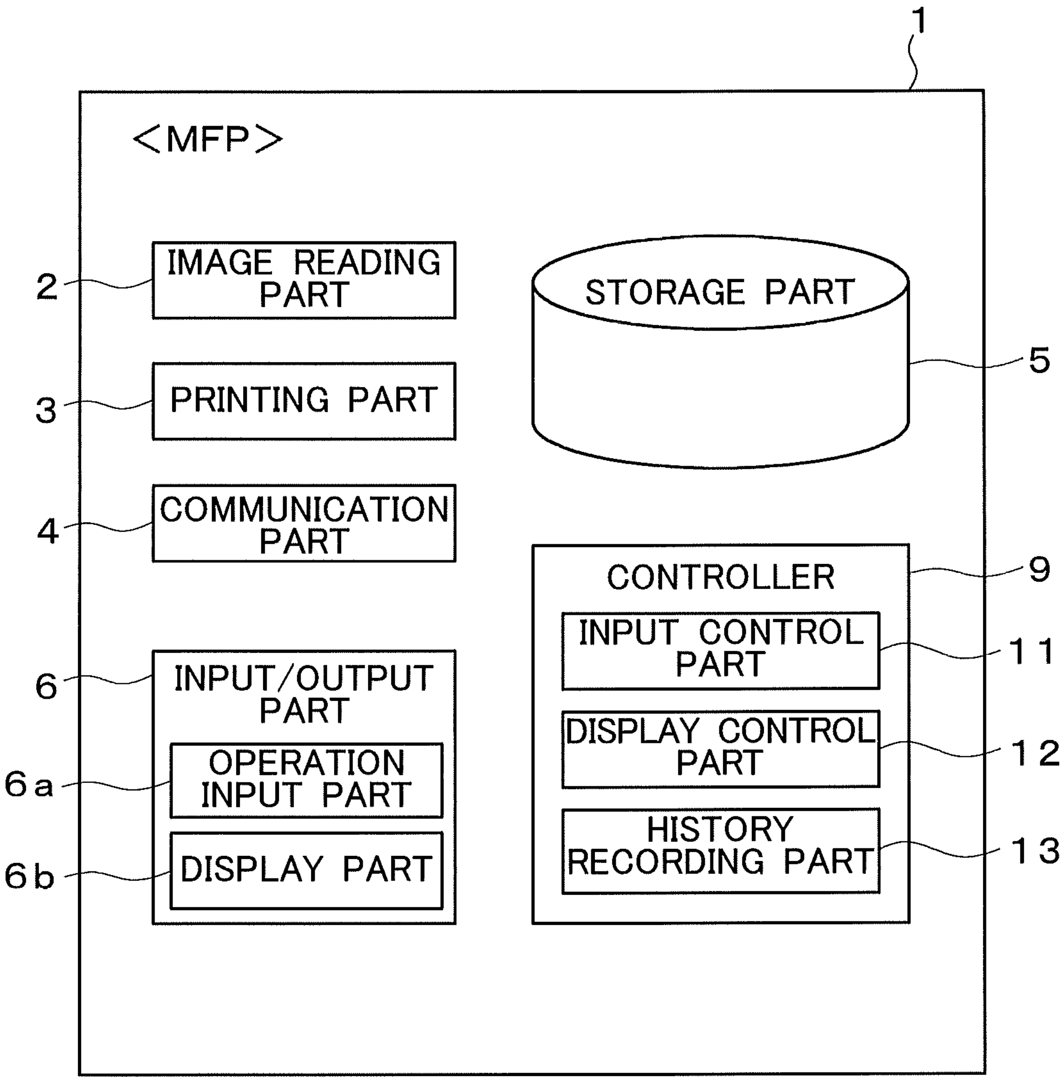
FIG. 2 is a functional block diagram showing a schematic constitution of the image forming apparatus.

FIG. 2 is a functional block diagram showing a schematic constitution of the image forming apparatus 1.

As shown in FIG. 2, the image forming apparatus 1 comprises an image reading part 2, a printing part 3, a communication part 4, a storage part 5, an input/output part 6, a controller 9, and the like and multiply uses these constituent parts to implement various functions.

The image reading part 2 is a processing part which optically reads an original manuscript placed on a predetermined position of the image forming apparatus 1 and generates image data of the original manuscript (referred to also as an "original manuscript image").

The printing part 3 is an output part which prints out an image to various media such as paper on the basis of the image data on an object image.

The communication part 4 is a processing part capable of performing facsimile communication via public networks or the like. Further, the communication part 4 is capable of performing network communication via a network NW. The network communication uses various protocols such as TCP/IP (Transmission Control Protocol/Internet Protocol), FTP (File Transfer Protocol), and the like, and by using the network communication, the image forming apparatus 1 can transmit and receive various data to/from desired partners.

The storage part 5 is a storage device such as a hard disk drive (HDD), a nonvolatile memory, or/and the like. In the storage part 5, stored is operation history information data TB1 shown in FIG. 4. In the operation history information data TB1, recorded is history information (operation history information) relating to an operation (or operations) which is (are) performed during a setting operation period.

Specifically, as shown in FIG. 4, in the operation history information data TB1, recorded are pieces of information of "Set Item", "Display", "Change of Settings", and "Setting Details". A set item (item name) to be operated is recorded in the "Set Item", and whether a setting screen SG corresponding to the set item to be operated has been displayed or not (Yes/No) is recorded in the "Display". Further, whether the set item to be operated has been changed or not (Yes/No) is recorded in the "Change of Settings", and a detail of the set item to be operated is recorded in the "Setting Details". The information recorded in the "Display" is also referred to as "display history information" and the information recorded in the "Change of Settings" is also referred to as "setting change history information".

Figure 3:
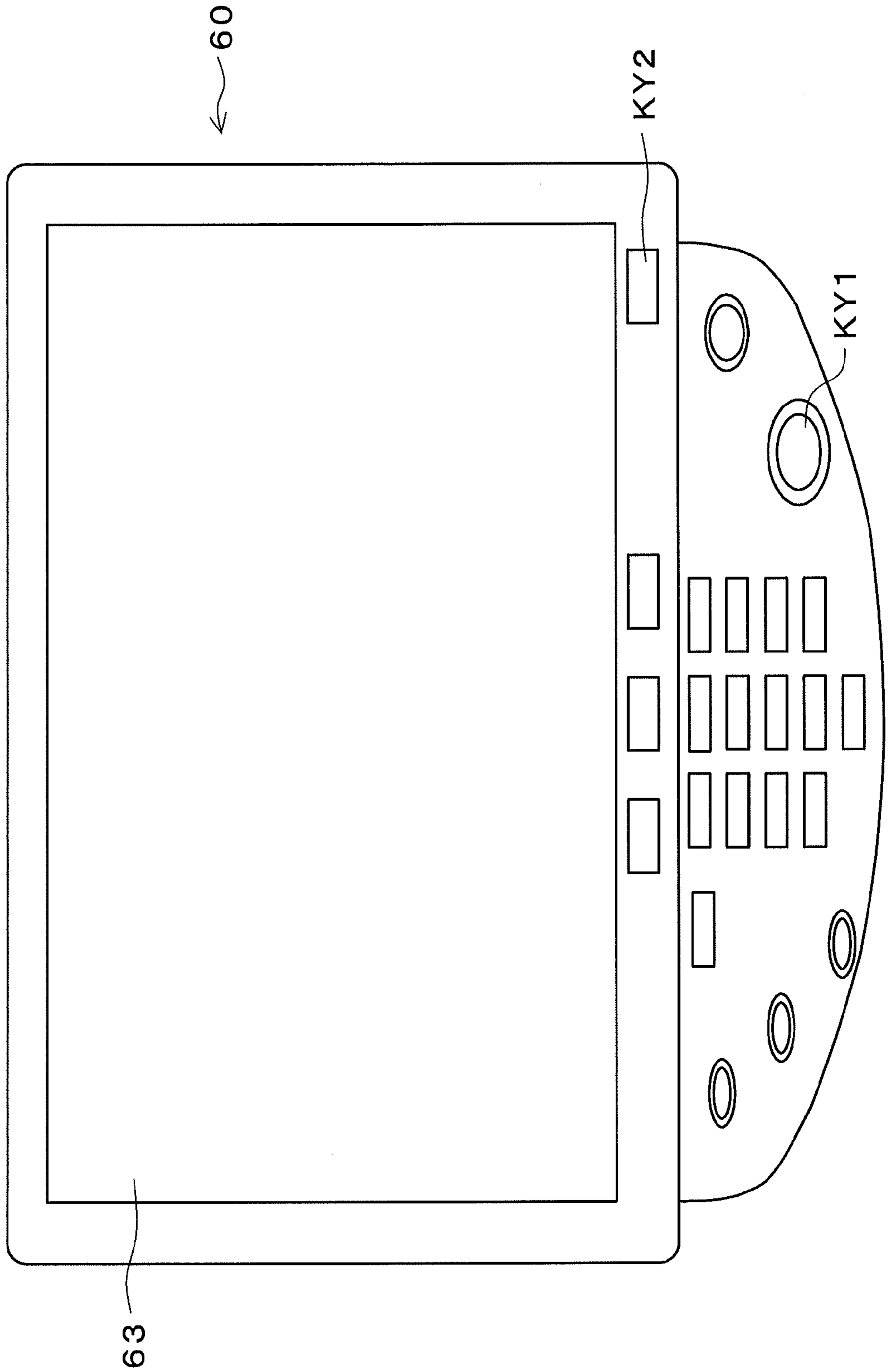
FIG. 3 is a view showing an appearance of an operation panel part.

The input/output part 6 comprises an operation input part 6*a* for receiving an input which is given to the image forming apparatus 1 and a display part 6*b* for displaying various information thereon. In more detail, the image forming apparatus 1 is provided with an operation panel part 60 (see FIGS. 1 and 3) which serves as the input/output part 6. As shown in FIG. 3, the operation panel part 60 is provided with hard keys KY (KY1, KY2, and the like) and a touch screen 63.

The hard keys KY serve as part of the operation input part 6*a*. Specifically, the hard keys KY include a start key KY1, a reset key KY2, other keys (a ten key and the like), and the like.

The touch screen 63 is a liquid crystal display panel in which a piezoelectric sensor or the like is embedded, serving as part of the display part 6*b* and also serving as part of the operation input part 6*a*. In more detail, the touch screen 63 is capable of displaying various information on the liquid crystal display panel and detecting a manipulation position of a finger of a user (an operator or the like) on the liquid crystal display panel to receive various inputs. When the finger of the user touches a virtual button displayed on the touch screen 63, for example, such a manipulation is regarded as a pressing operation on the virtual button.

Thus, the input/output part 6 is capable of displaying appropriate information to the user and receiving an input operation of the user.

The controller 9 is a control part for generally controlling the image forming apparatus 1 and comprises a CPU and various semiconductor memories (RAM, ROM, and the like). It can be also said that the controller 9 is a computer which is embedded in the image forming apparatus 1. Various processing parts operate under the control of the controller 9 to implement various functions of the image forming apparatus 1. The controller 9 causes the CPU to execute a predetermined software program (hereinafter, referred to simply as a "program") PG (referred to also as "PG1") stored in the ROM (e.g., EEPROM or the like), to thereby implement various processing parts. Further, the program PG1 may be acquired via various portable (in other words, non-transitory) computer-readable recording media (a USB memory or the like). Alternatively, the program PG may be downloaded via the network or the like and installed into the image forming apparatus 1.

Specifically, the controller 9 implements various processing parts including an input control part 11, a display control part 12, a history recording part 13, and the like. The input control part 11 is a processing part for receiving an operation input from the user. The display control part 12 is a processing part for controlling a display on the touch screen 63 or the like in the operation panel part 60. The history recording part 13 is a processing part for recording history information relating to the operation(s) performed during the setting operation period as the operation history information data TB1.

1-2. Operation

As discussed above, in an image forming apparatus provided with two exclusive partial areas in the display part, a setting screen for mode setting can be displayed only in the one partial area among the two partial areas and a job list screen or the like can be displayed only in the other partial area among the two partial areas.

In contrast to this, in the image forming apparatus 1 of the first preferred embodiment, as discussed later, a setting screen SG for mode setting (see FIGS. 8 to 11) and a job list screen JG displaying a list of jobs (see FIG. 12) are selectively displayed on the touch screen 63 in response to the operation input form the user. For this reason, it is possible to avoid a situation where the setting screen SG can be displayed only in the one partial area of the touch screen 63 and also possible to avoid another situation where the job list screen JG can be displayed only in the other partial area of the touch screen 63. Therefore, it is possible to efficiently use the touch screen 63 (accordingly, the display part 6*b*).

As a technique for selectively displaying the setting screen SG and the job list screen JG, suggested is, for example, a technique in which only after the setting screen SG is closed by pressing an "OK" button or a "Cancel" button while the setting screen SG is being displayed, the other screen (the job list screen JG) can be displayed. In other words, suggested is a technique in which after the setting screen SG is hid by giving a non-display instruction for the setting screen SG which is being displayed, a display instruction for the job list screen JG is given, to thereby display the job list screen JG.

Herein, as to such a technique, a situation will be considered where while a user UA is performing a setting operation for mode setting, a user UB intends to watch the job list screen JG. In this situation, the "OK" button or the "Cancel" button is pressed while the setting screen SG is being displayed, to thereby once hide the setting screen SG, and then the job list screen JG is displayed on the touch screen 63 in response to the display instruction for the job list screen JG. Thus, the setting operation performed by the user UA is interrupted, and the user UB can watch the job list screen JG. After the user UB finishes to watch the job list screen JG, the user UA can call up again the setting screen relating to an item to be set, by his own operation, to thereby resume the setting operation.

When the user UA displays the setting screen SG again after the user UB finishes to watch the job list screen JG, however, the user UA who is obliged to suspend the setting operation for mode setting sometimes forgets the detail of the setting operation before the interruption and therefore, it may become hard to resume the setting operation (though it depends on the length of the period while the user UB watches the job list screen JG).

Then, in the first preferred embodiment, as discussed later, the image forming apparatus 1 hides the job list screen JG in response to a non-display instruction RC2 for the job list screen JG (see FIG. 12) and displays the setting screen SG (FIGS. 8 to 11 and the like) used during a setting operation period TM for mode setting, on the touch screen 63. In more detail, the image forming apparatus 1 displays the last setting screen (in detail, referred to also as the "last display screen) SG which is displayed last during the setting operation period, on the touch screen 63. Accordingly, even when the job list screen JG is displayed in response to a display instruction RC1 for the job list screen JG and the setting operation for mode setting is interrupted, the last setting screen SG in setting operation period TM is displayed after that in response to the non-display instruction RC2 for the job list screen JG. Therefore, by watching the last setting screen SG, the user can easily recognize the setting operation which is performed last during the setting operation period TM.

Hereinafter, with reference to FIGS. 5 to 12, detailed discussion will be made on an operation of the image forming apparatus 1.

Figure 5:
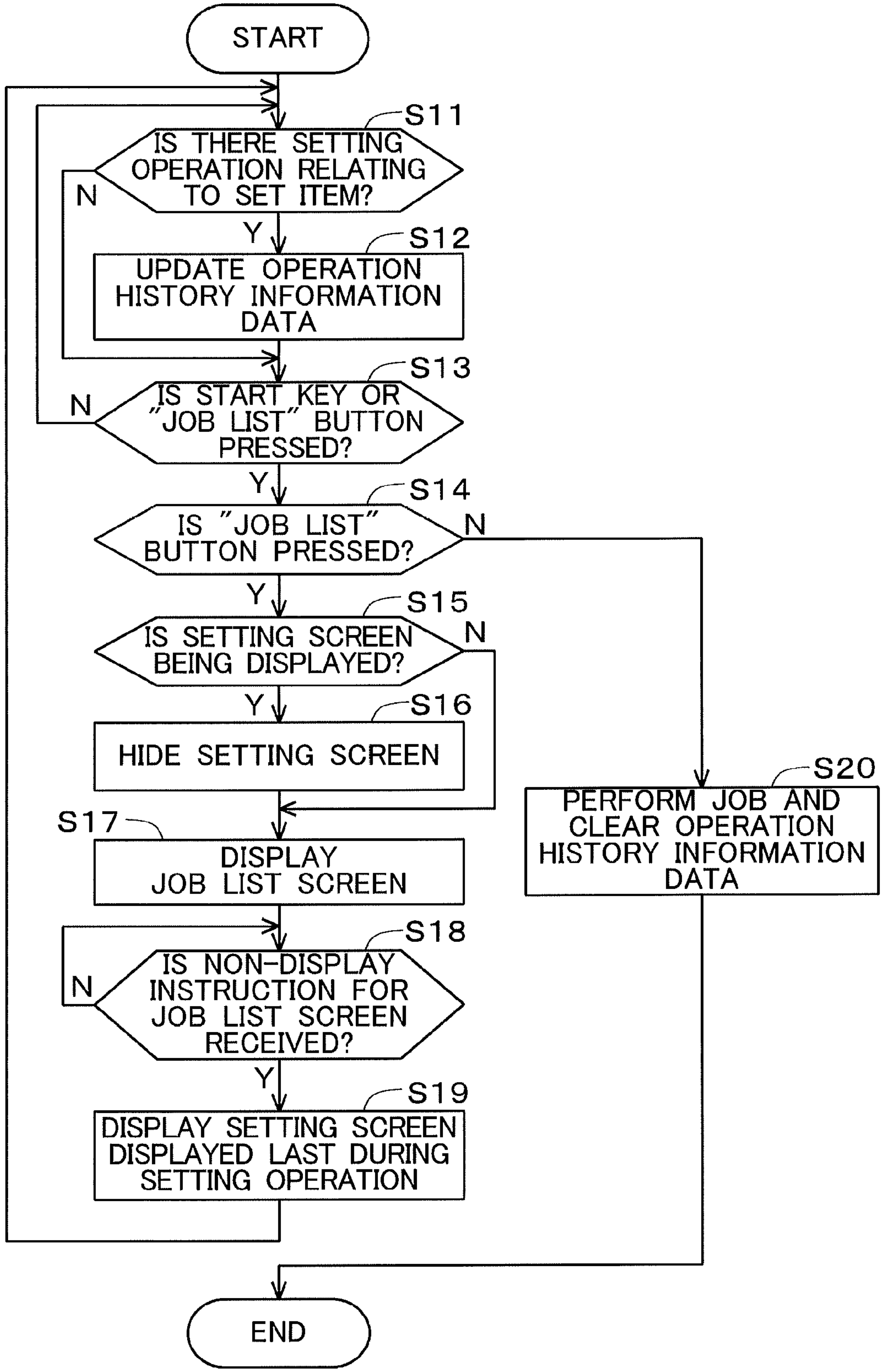
FIGS. 5 and 6 are flowcharts showing an operation of the image forming apparatus.
Figure 6:
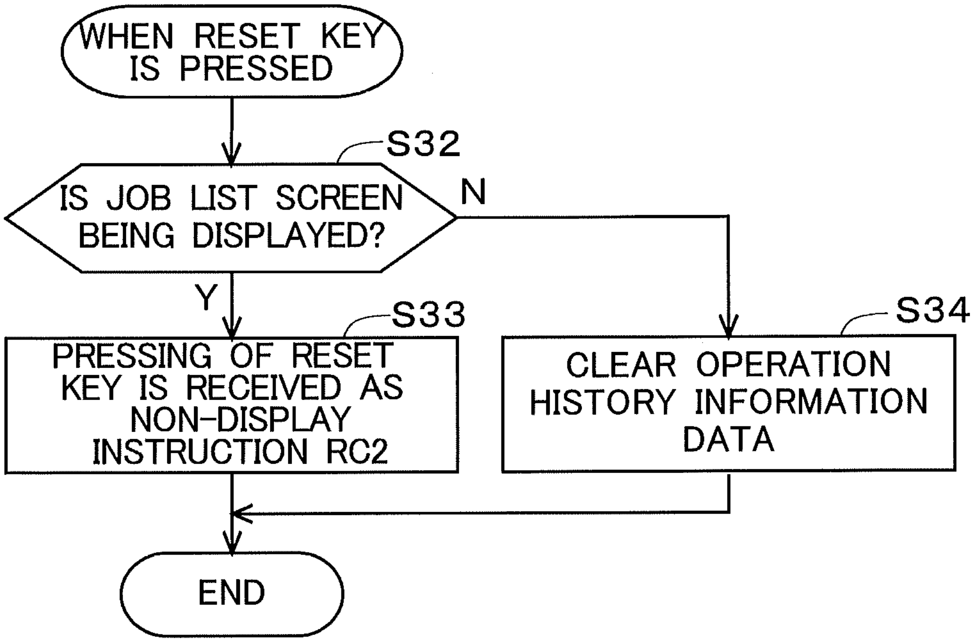

FIGS. 5 and 6 are flowcharts showing an operation of the image forming apparatus 1 in accordance with the first preferred embodiment. FIGS. 7 to 12 are views showing screens GA1 to GA6, respectively, displayed on the touch screen 63.

Figure 7:
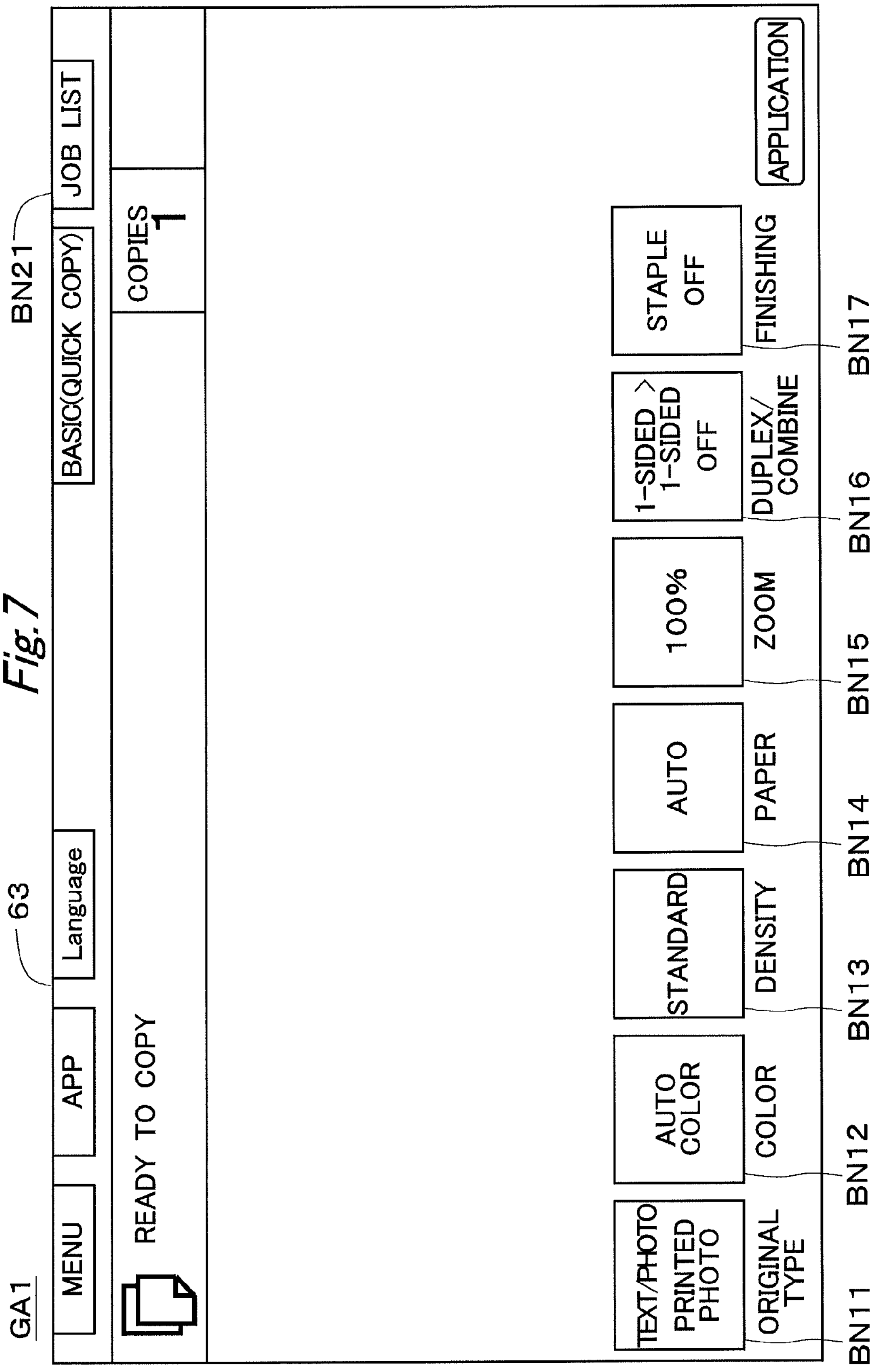
FIG. 7 is a view showing an initial screen.
Figure 8:
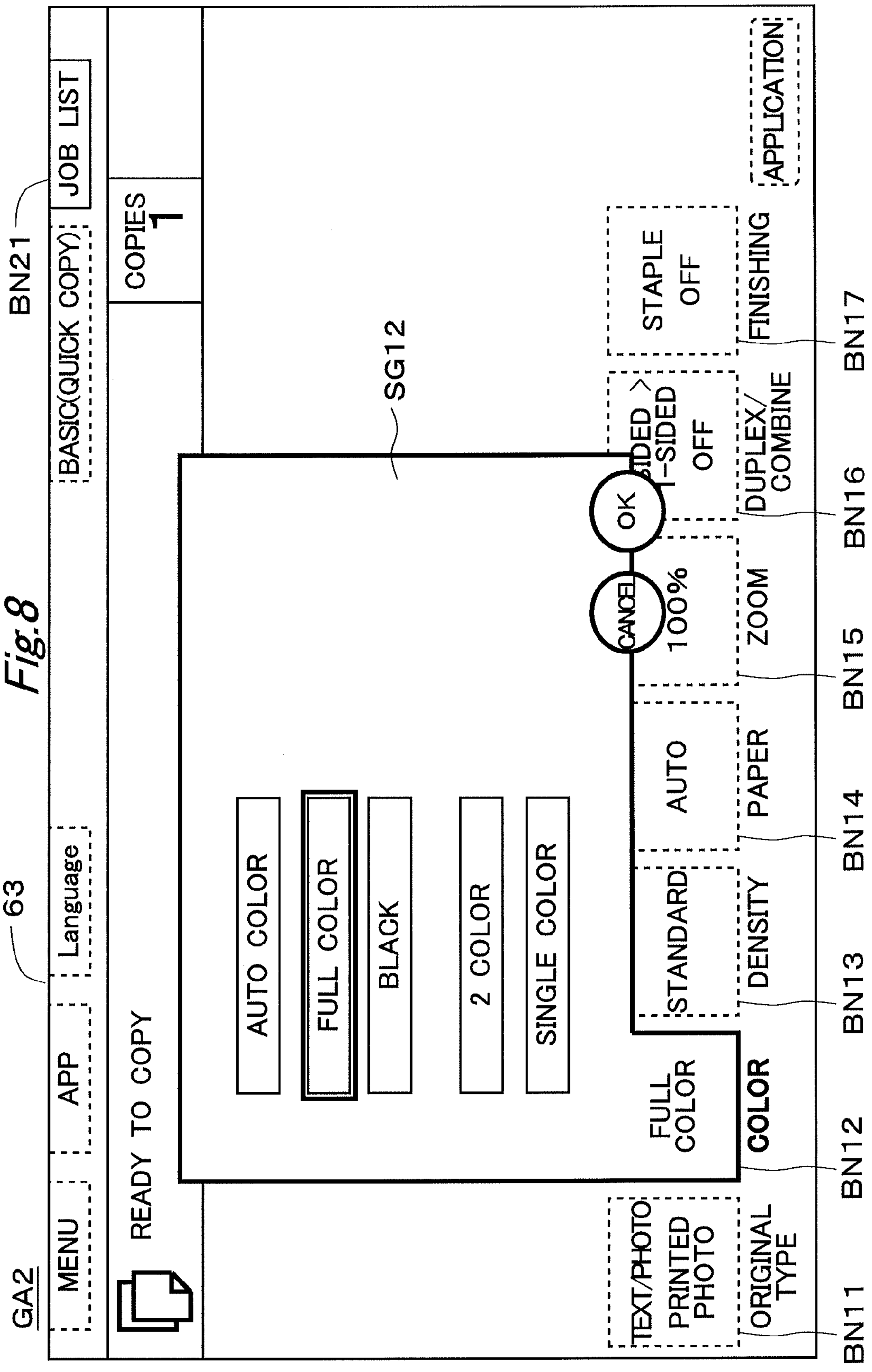
FIGS. 8 to 11 are views each showing a setting screen.
Figure 9:
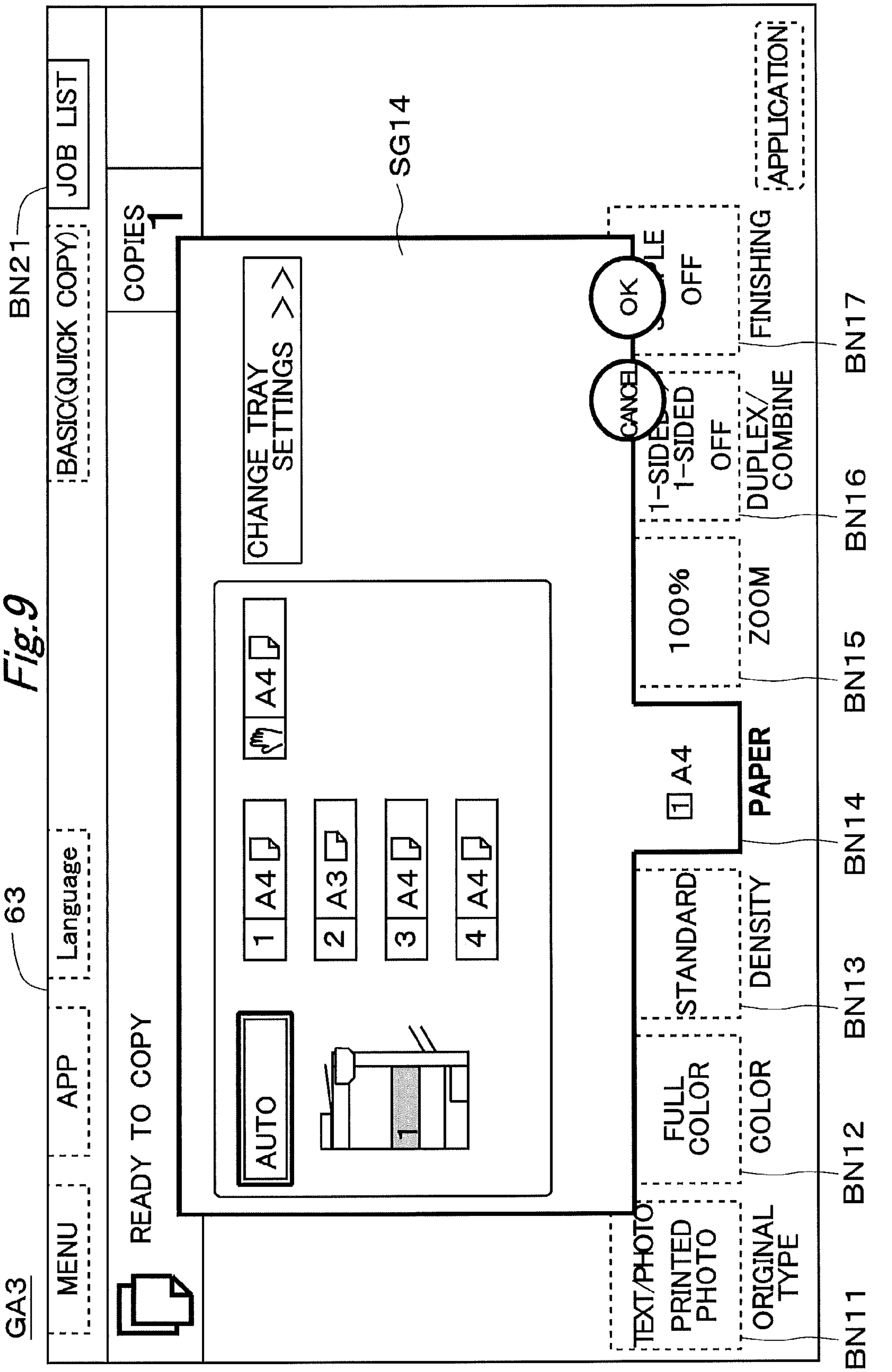
Figure 10:
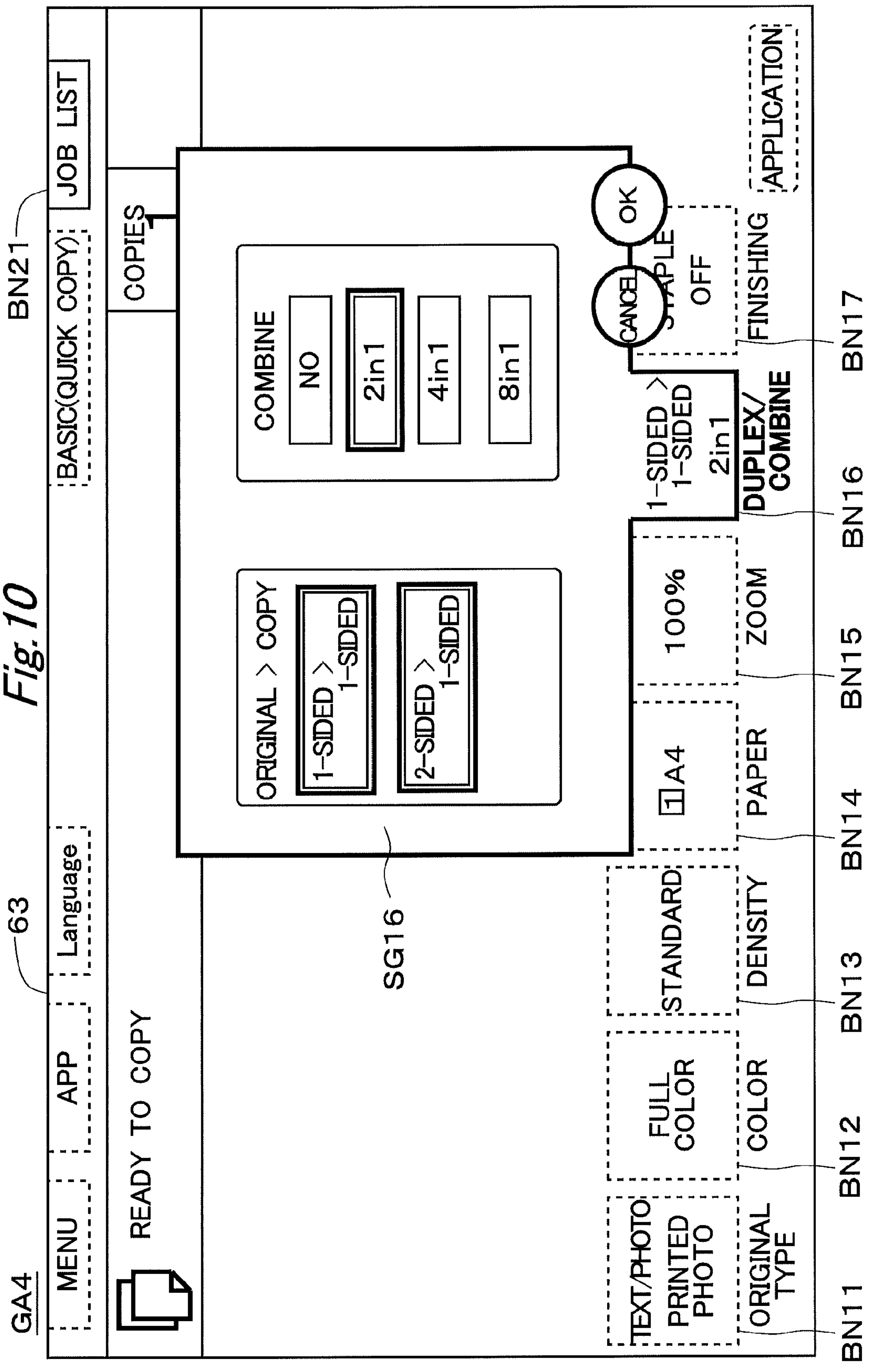
Figure 11:
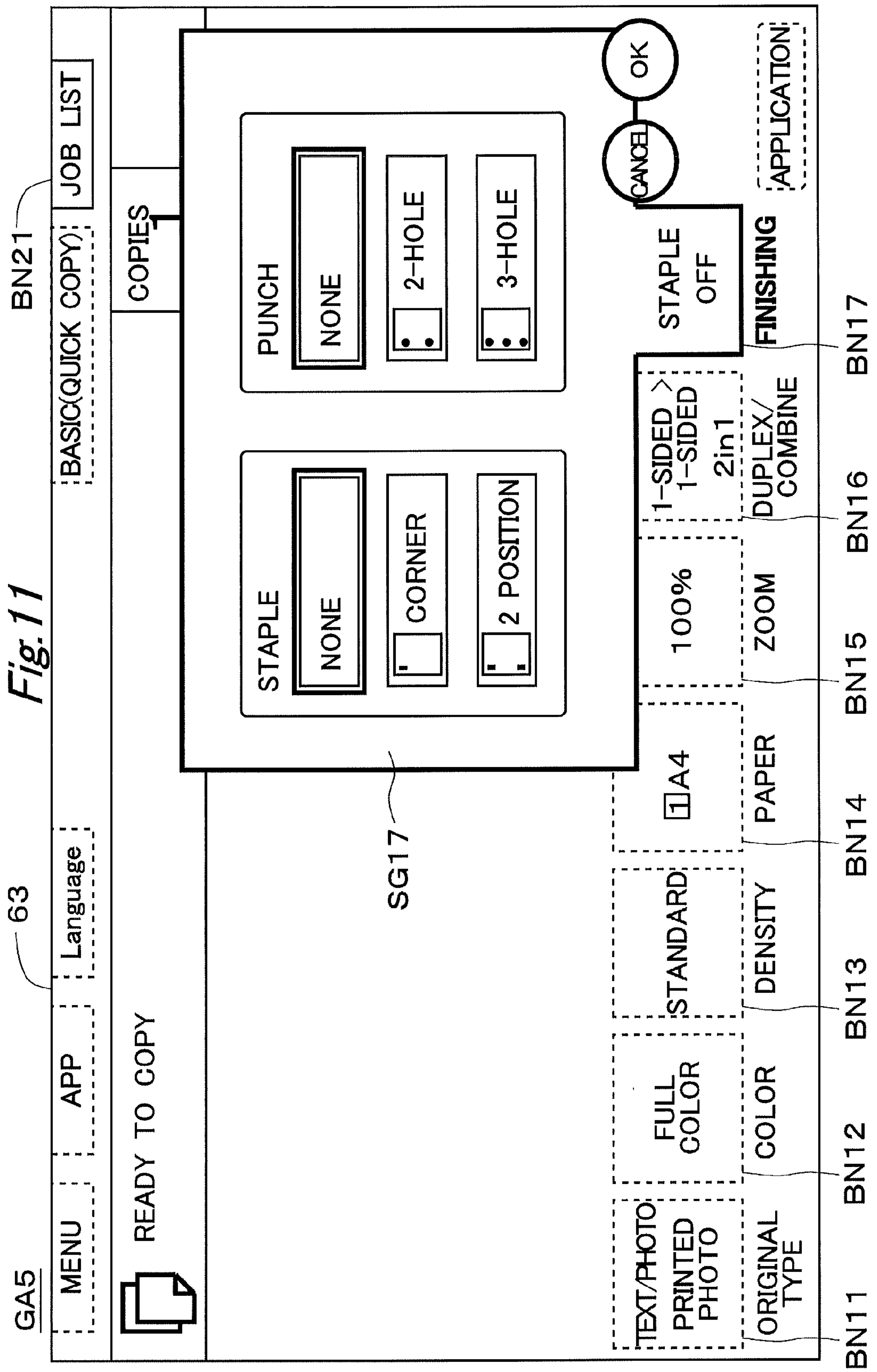
Figure 12:
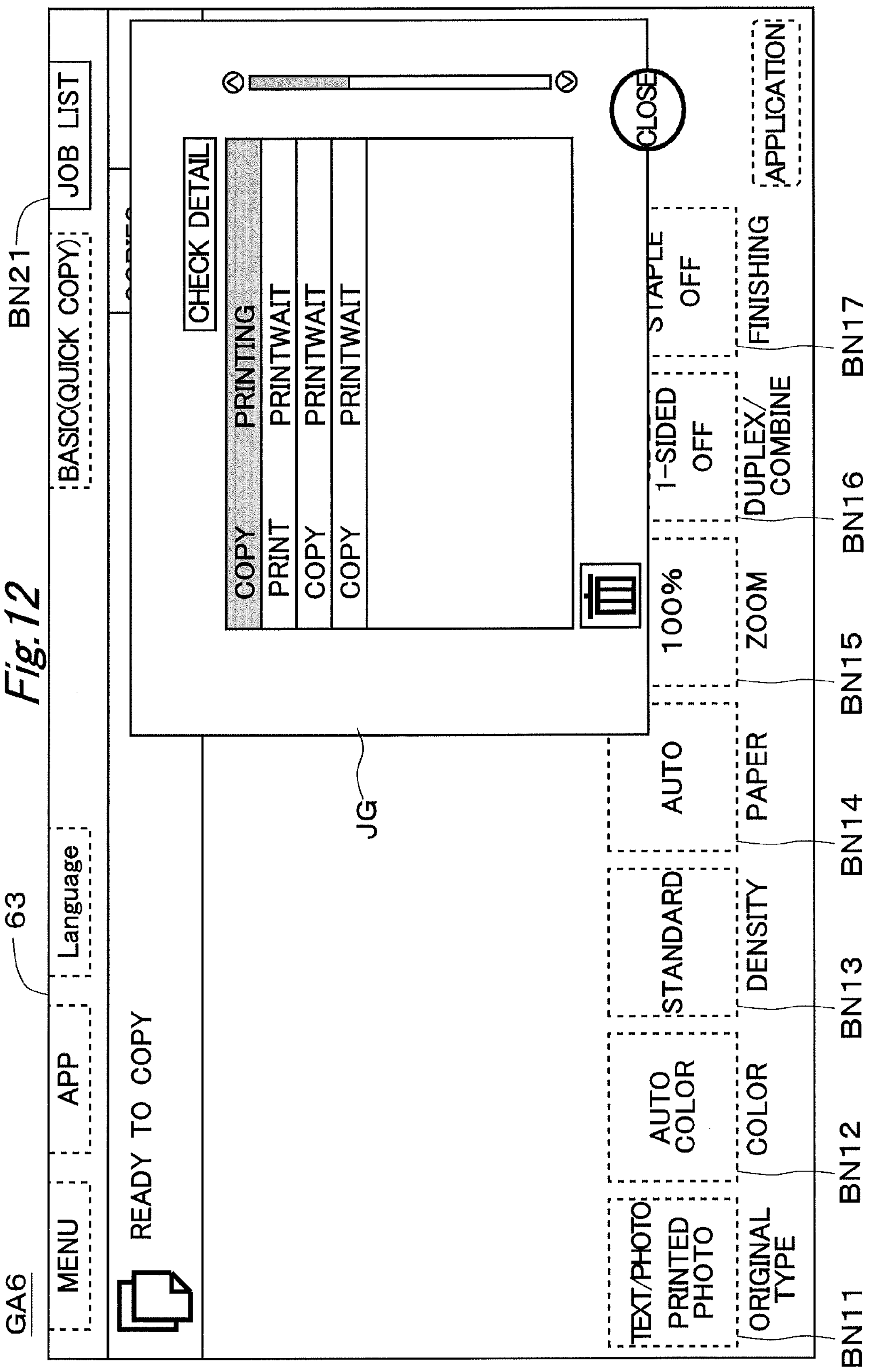
FIG. 12 is a view showing a job list screen.

In more detail, FIG. 7 is a view showing an initial screen (referred to also as a "default screen") GA1 displayed on the touch screen 63 immediately after the turn-on, the pressing of the reset key KY2 (see FIG. 3), or the like. FIG. 8 is a view showing a screen GA2 having a setting screen SG12 for setting of a "Color" mode. FIG. 9 is a view showing a screen GA3 having a setting screen SG14 for setting of a "Paper" mode. FIG. 10 is a view showing a screen GA4 having a setting screen SG16 for setting of a "Duplex/Combine" mode. FIG. 11 is a view showing a screen GA5 having a setting screen SG17 for setting of a "Finishing" mode. FIG. 12 is a view showing a screen GA6 having the job list screen JG.

In the default screen GA1 of FIG. 7, displayed are (virtual) buttons BN11 to BN17 corresponding to respective set items, "Original Type", "Color", "Density", "Paper", "Zoom", "Duplex/Combine", and "Finishing".

When any one of the buttons BN11 to BN17 is pressed, the display control part 12 pops up the setting screen SG for the set item corresponding to the pressed button, on the touch screen 63. By using the setting screens SG (see FIGS. 8 to 11), the user can set various modes.

Further, in each of the screens GA1 to GA2 (FIGS. 7 to 12), a "Job List" button BN21 is also displayed. When the "Job List" button BN21 is pressed and the display instruction RC1 for the job list screen JG (an instruction for displaying the job list screen JG) is received, the display control part 12 pops up the job list screen JG shown in FIG. 12 on the touch screen 63.

In the job list screen JG of FIG. 12, displayed is a list of jobs including a running job (a printing job or the like), a waiting job (a print wait job or the like), and the like.

Further, in the job list screen JG, displayed is a "Close" button (a button having the character "Close" surrounded by a heavy circle in FIG. 12) for receiving the non-display instruction RC2 for the job list screen JG (an instruction for hiding the job list screen JG). When the "Close" button is pressed while the job list screen JG is being displayed, the display control part 12 determined that the non-display instruction RC2 for the job list screen JG is received and hides the job list screen JG. Also when the reset key KY2 (see FIG. 3) or the "Job List" button BN21 is pressed while the job list screen JG is being displayed, the display control part 12 determined that the non-display instruction RC2 for the job list screen JG is received and hides the job list screen JG.

Further, while the job list screen JG is being displayed, the buttons (buttons BN11 to BN17 and the like) displayed outside the job list screen JG are disabled as a general rule for the purpose of preventing any wrong operation. The "Job List" button BN21 is valid exceptionally, however, even when the job list screen JG is being displayed, for the purpose of receiving the non-display instruction RC2 for the job list screen JG as discussed above.

Hereinafter, discussion will be a case where setting operations relating to four kinds of set items ((1) "Color", (2) "Paper", (3) "Duplex/Combine", and (4) "Finishing") are sequentially performed during the setting operation period TM from a time T10 to a time T20, and then (5) an operation for displaying the job list screen JG and (6) an operation for hiding the job list screen JG are subsequently performed.

(1) First, a setting operation relating to the set item "Color" is performed. Specifically, after the setting screen SG12 corresponding to the set item "Color" is displayed, a default "Auto Color" mode is changed to a "Full Color" mode.

In more detail, at the time T10, first, when a button BN12 in the screen GA1 (FIG. 7) is pressed, it is determined in Step S11 in FIG. 5 that the setting operation relating to the set item "Color" is performed (started, in more detail), and the process goes to Step S12.

In Step S12, the display control part 12 pops up the setting screen SG12 of FIG. 8 on the touch screen 63. The history recording part 13 updates the operation history information data TB1. Specifically, the history recording part 13 records "Color" into the first "Set Item" in the operation history information data TB1 and records "Yes" into the "Display" as shown in FIG. 4. In other words, it is recorded that the setting screen SG12 relating to the set item "Color" is displayed. At this point in time, since any setting operation for mode setting of the set item "Color" is not performed yet, the history recording part 13 records "No" into the first "Change of Settings" in the operation history information data TB1 and records default "Auto Color" into the "Setting Details".

After the operation history information data TB1 is updated, it is determined in Step S13 whether or not the start key KY1 or the "Job List" button BN21 is pressed. When it is determined that the start key KY1 or the "Job List" button BN21 is pressed, the process goes to Step S14, and otherwise the process returns to Step S11. At this point in time, since neither the start key KY1 nor the "Job List" button BN21 is pressed, the process returns to Step S11.

The process steps S11 to S13 are repeatedly performed until it is determined that the start key KY1 or the "Job List" button BN21 is pressed. This execution state is also referred to as a state (referred to also as a "standby state WS1") for waiting for a pressing operation of any operation member. In the standby state WS1, not only the start key KY1 or the "Job List" button BN21 but also a setting operation relating to the set item can be received.

In the standby state WS1, a "Full Color" button (a button having the character "Full Color" surrounded by a rectangle in FIG. 8) in the setting screen SG12 (FIG. 8) is pressed and the "OK" button (a button having the character "OK" surrounded by a heavy circle in this figure) is further pressed. Then, in response to the pressing operation, it is determined again that the setting operation relating to the set item "Color" is performed, and the process goes from Step S11 to Step S12.

In Step S12, the image forming apparatus 1 changes the mode for the set item "Color" from the default "Auto Color" to the "Full Color".

The history recording part 13 records "Yes" into the first "Change of Settings" in the operation history information data TB1 and records "Full Color" into the first "Setting Details" as shown in FIG. 4. In other words, it is recorded that the setting for the set item "Color" is changed, and further, the detail of the setting is recorded.

Further, the display control part 12 hides the setting screen SG12.

Then, the process returns through Step S13 to Step S11, and the image forming apparatus 1 goes into the standby state WS1 again.

When the "Cancel" button (a button having the character "Cancel" surrounded by a heavy circle in this figure) in the setting screen SG12 of FIG. 8, instead of the "OK" button, is pressed, the image forming apparatus 1 does not change the mode for the set item "Color" and the hides the setting screen SG12. For example, when the "Full Color" button in the setting screen SG12 is pressed and then the "Cancel" button is pressed, the image forming apparatus 1 does not change the mode for the set item "Color" from the "Auto Color" to the "Full Color" and hides the setting screen SG12.

(2) Subsequently, a setting operation relating to the set item "Paper" is performed. Specifically, after the setting screen SG14 corresponding to the set item "Paper" is displayed, a default "Auto" mode is not changed and the setting screen SG14 is hid.

In more detail, first, when a button BN14 in the screen GA1 is pressed, it is determined in Step S11 in FIG. 5 that the setting operation relating to the set item "Paper" is performed, and the process goes to Step S12.

In Step S12, the display control part 12 pops up the setting screen SG14 of FIG. 9 on the touch screen 63. The history recording part 13 records "Paper" into the second "Set Item" in the operation history information data TB1 and records "Yes" into the "Display" as shown in FIG. 4. In other words, it is recorded that the setting screen SG14 relating to the set item "Paper" is displayed. At this point in time, since any setting operation for mode setting of the set item "Paper" is not performed yet, the history recording part 13 records "No" into the second "Change of Settings" in the operation history information data TB1 and records default "Auto" into the "Setting Details".

Then, the process returns through Step S13 to Step S11, and the image forming apparatus 1 goes into the standby state WS1 again.

After that, in the standby state WS1, without performing any setting change operation for mode setting, the "OK" button or the "Cancel" button in the setting screen SG14 (FIG. 9) is pressed. In response to the pressing of this button, the display control part 12 hides the setting screen SG14.

(3) Subsequently, a setting operation relating to the set item "Duplex/Combine" is performed. Specifically, after the setting screen SG16 corresponding to the set item "Duplex/Combine" is displayed, a default "1-Sided>1-Sided/Off" mode is changed to a "1-Sided>1-Sided/2 in 1" mode.

In more detail, first, when a button BN16 in the screen GA1 is pressed, it is determined in Step S11 in FIG. 5 that the setting operation relating to the set item "Duplex/Combine" is performed, and the process goes to Step S12.

In Step S12, the display control part 12 pops up the setting screen SG16 of FIG. 10 on the touch screen 63. The history recording part 13 records "Duplex/Combine" into the third "Set Item" in the operation history information data TB1 and records "Yes" into the "Display" as shown in FIG. 4. In other words, it is recorded that the setting screen SG16 relating to the set item "Duplex/Combine" is displayed. At this point in time, since any setting operation for mode setting of the set item "Duplex/Combine" is not performed yet, the history recording part 13 records "No" into the third "Change of Settings" in the operation history information data TB1 and records default "1-Sided>1-Sided/Off" into the "Setting Details".

Then, the process returns through Step S13 to Step S11, and the image forming apparatus 1 goes into the standby state WS1 again.

After that, in the standby state WS1, a "2 in 1" button in the setting screen SG16 (FIG. 10) is pressed and the "OK" button is further pressed. Then, in response to the pressing operation, it is determined in Step S11 that the setting operation relating to the set item "Duplex/Combine" is performed, and the process goes to Step S12.

In Step S12, the image forming apparatus 1 changes the mode for the set item "Duplex/Combine" from the default "1-Sided>1-Sided/Off" to the "1-Sided>1-Sided/2 in 1". The history recording part 13 records "Yes" into the third "Change of Settings" in the operation history information data TB1 and records "1-Sided>1-Sided/2 in 1" into the "Setting Details" as shown in FIG. 4. Further, the display control part 12 hides the setting screen SG16.

The image forming apparatus 1 goes into the standby state WS1 again.

Finally, a setting operation relating to the set item "Finishing" is performed. Specifically, after the setting screen SG17 corresponding to the set item "Finishing" is displayed. As discussed later, while the setting screen SG17 is being displayed (in other words, at some midpoint in the last setting operation), the display instruction RC1 for the job list screen JG is received.

In more detail, first, when a button BN17 in the screen GA1 is pressed, it is determined that the setting operation relating to the set item "Finishing" is performed, and the process goes from Step S11 to Step S12.

In Step S12, the display control part 12 pops up the setting screen SG17 of FIG. 11 on the touch screen 63. The history recording part 13 records "Finishing" into the fourth "Set Item" in the operation history information data TB1 and records "Yes" into the "Display" as shown in FIG. 4. In other words, it is recorded that the setting screen SG17 relating to the set item "Finishing" is displayed. At this point in time, since any setting operation for mode setting of the set item "Finishing" is not performed yet, the history recording part 13 records "No" into the fourth "Change of Settings" in the operation history information data TB1 and records default "Staple Off" into the "Setting Details".

Then, the image forming apparatus 1 goes into the standby state WS1 again.

Thus, while the setting operations relating to the set items ("Color", "Paper", "Duplex/Combine", "Finishing" and the like) are performed, the history information on the operations performed during the setting operation period TM is recorded as the operation history information data TB1.

(5) Subsequently, the display instruction RC1 for the job list screen JG is received at the time T20 while the setting screen SG17 is being displayed, and then in response to the display instruction RC1, the operation for displaying the job list screen JG is performed.

In more detail, the "Job List" button BN21 is pressed and the display instruction RC1 for the job list screen JG is received while the setting screen SG17 of FIG. 11 is being displayed. When the display instruction RC1 is received, the process goes through Steps S13 and 14 to Step S15.

In Step S15, it is determined whether or not the setting screen SG17 which is displayed last during the setting operation period TM (from the time T10 to the time T20) is being displayed on the touch screen 63. When the setting screen SG17 which is displayed last is being displayed, the process goes to Step S16, and otherwise the process goes to Step S17. In this case, since the "Job List" button BN21 is pressed while the setting screen SG17 is being displayed, the process goes to Step S16.

In Step S16, the display control part 12 hides the setting screen SG17 which is displayed last during the setting operation period TM. After the setting screen SG17 is hid, the display control part 12 displays the job list screen JG on the touch screen 63 as shown in FIG. 12 in Step S17.

Then, the process goes from Step S17 to Step S18. In Step S18, it is determined whether or not the non-display instruction RC2 for the job list screen JG is received. The operation of Step S18 continues until the non-display instruction RC2 for the job list screen JG is received. It can be also said that the state where the operation of Step S18 is performed is a state (referred to also as a "standby state WS2") for waiting for the non-display instruction RC2.

(6) After that, while the job list screen JG is being displayed (in other words, in the standby state WS2 (for the non-display instruction RC2)), the non-display instruction RC2 for the job list screen JG is received and an operation of hiding the job list screen JG, and the like, are performed in response to the non-display instruction RC2.

In more detail, when the "Close" button, for example, is pressed and the non-display instruction RC2 for the job list screen JG is received while the job list screen JG is being displayed, the process goes from Step S18 to Step S19.

In Step S19, in response to the non-display instruction RC2, the display control part 12 hides the job list screen JG and displays a display screen (hereinafter, referred to as an "information display screen IG") relating to the operation performed during the setting operation period TM on the basis of the operation history information data TB1 (see FIG. 4).

More specifically, first, the display control part 12 determines the setting screen SG which is displayed last during the setting operation period TM as the information display screen IG on the basis of the information of the "Display" (display history information) recorded in the operation history information data TB1. In this case, as shown in FIG. 4, since the set item "Finishing" is recorded last (fourth) and "Yes" is recorded in the "Display" (display history information), the display control part 12 determines the setting screen SG17 corresponding to the set item "Finishing" as the information display screen IG. Then, the display control part 12 hides the job list screen JG and displays the setting screen SG17 which is displayed last during the setting operation period TM, on the touch screen 63.

After the operation of Step S19 is completed, the process goes to Step S11 again, and the image forming apparatus 1 goes into the standby state WS1.

After that, when the start key KY1 is pressed in the standby state WS1, the process goes from Step S14 to Step S20. In Step S20, the image forming apparatus 1 performs a target job (e.g., a target copy job). Further, the image forming apparatus 1 deletes (initializes) the pieces of information recorded in the operation history information data TB1.

Further, the pieces of information recorded in the operation history information data TB1 are initialized also when the reset key KY2 (see FIG. 3) is pressed, as a general rule. The pressing of the reset key KY2 performed while the job list screen JG is being displayed is, however, received as the non-display instruction RC2 for the job list screen JG as discussed above. For this reason, when the reset key KY2 is pressed while the job list screen JG is being displayed, the pieces of information recorded in the operation history information data TB1 are not initialized exceptionally. In other words, depending on whether or not the job list screen JG is being displayed on the touch screen 63, an operation to be performed when the reset key KY2 is pressed varies. FIG. 6 is a flowchart showing the above-discussed operation to be performed when the reset key KY2 is pressed.

When it is determined that the reset key KY2 is pressed, the operation shown in FIG. 6 is performed. First, in Step S32 of FIG. 6, it is determined whether or not the job list screen JG is being displayed on the touch screen 63. When the job list screen JG is being displayed, the process goes to Step S33. In Step S33, the pressing of the reset key KY2 (performed while the job list screen JG is being displayed) is received as the non-display instruction RC2 for the job list screen JG, and the display control part 12 hides the job list screen JG. On the other hand, when the job list screen JG is not being displayed, the process goes to Step S34. In Step S34, the history recording part 13 initializes the pieces of information recorded in the operation history information data TB1.

Thus, in the operation of the first preferred embodiment, the setting screens SG (see FIGS. 8 to 11) and the job list screen JG (see FIG. 12) are selectively displayed on the touch screen 63 in response to the operation input from the user. For this reason, it is possible to avoid a situation where the setting screen SG can be displayed only in a restrictive partial area of the touch screen 63 and also possible to avoid another situation where the job list screen JG can be displayed only in the other partial area of the touch screen 63. Therefore, it is possible to efficiently use the touch screen 63 (accordingly, the display part 6*b*).

Further, when the display instruction RC1 for the job list screen JG (see FIG. 12) is received while the setting screen SG17 (see FIG. 11), for example, is being displayed, the display control part 12 hides the setting screen SG17 which has been displayed until then and displays the job list screen JG on the touch screen 63 in place of the setting screen SG17.

After that, when the non-display instruction RC2 for the job list screen JG is received while the job list screen JG is being displayed, the display control part 12 hides the job list screen JG and displays the setting screen SG17 as the information display screen IG. In more detail, in response to the non-display instruction RC2, the job list screen JG (see FIG. 12) is hid and the setting screen SG17 (see FIG. 11) which is displayed last during the setting operation period TM is displayed as the information display screen IG on the touch screen 63.

Accordingly, even when the job list screen JG is displayed in response to the display instruction RC1 (Step S17 in FIG. 5) and the setting operation for mode setting is interrupted, the setting screen SG17 is displayed as the information display screen IG after that in response to the non-display instruction RC2 (Steps S18 and S19). Therefore, by watching the setting screen SG17 after the non-display instruction RC2, the user can easily recognize the setting operation which is performed last during the setting operation period TM. Especially, since the setting screen SG17 is displayed on the touch screen 63 without requiring any labor (the pressing of the button BN17 or the like) of the user, the labor of the user can be reduced. Further, it is possible for the user to easily resume the mode setting operation relating to the set item "Finishing" by using the corresponding setting screen SG17.

Though the display instruction RC1 for the job list screen JG is received while the setting screen SG (in detail, SG17) is being displayed in the above-discussed case, this is only one exemplary case. The display instruction RC1 for the job list screen JG may be received after the setting screen SG is hid.

There may be a case, for example, where the display instruction RC1 for the job list screen JG is received after the setting screen SG16 is hid and before the setting screen SG17 is displayed. In this case, when the non-display instruction RC2 for the job list screen JG is received after that, the display control part 12 has only to hide the job list screen JG and display the setting screen SG16 displayed last during the setting operation period TM on the touch screen 63 in Step S19.

2. The Second Preferred Embodiment

The second preferred embodiment is a variation of the first preferred embodiment.

In the second preferred embodiment, as the above-discussed information display screen IG (a screen relating to the operation performed during the setting operation period TM), a list screen of operation history on a setting operation (or setting operations) is displayed.

Hereinafter, with reference to the flowchart of FIG. 13, discussion will be made on the second preferred embodiment, centering on the difference from the first preferred embodiment.

Figure 13:
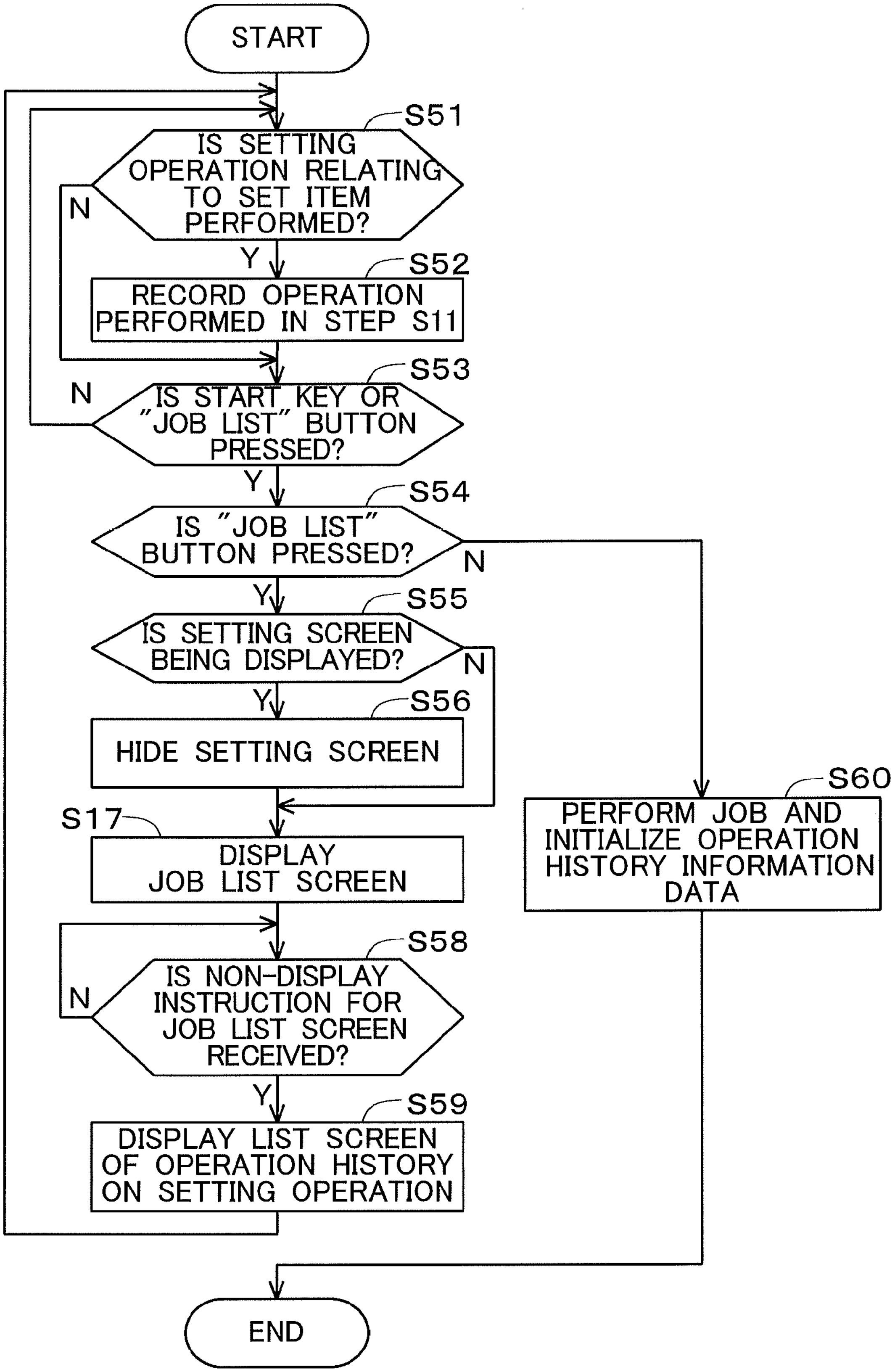
FIG. 13 is a flowchart showing an operation of the image forming apparatus in accordance with a second preferred embodiment.

In the second preferred embodiment, the operation of Step S59 in FIG. 13 is different from the operation of corresponding Step S19 (see FIG. 5) in the first preferred embodiment. In Steps S51 to S58 and S60 of FIG. 13, the same operations are performed as those in Steps S11 to S18 and S20 of FIG. 5, respectively.

Specifically, in Step S59, in response to the non-display instruction RC2, the display control part 12 hides the job list screen JG and pops up a list screen LG of operation history on a setting operation (or setting operations) (see FIG. 14) on the touch screen 63 on the basis of the operation history information data TB1.

Figure 14:
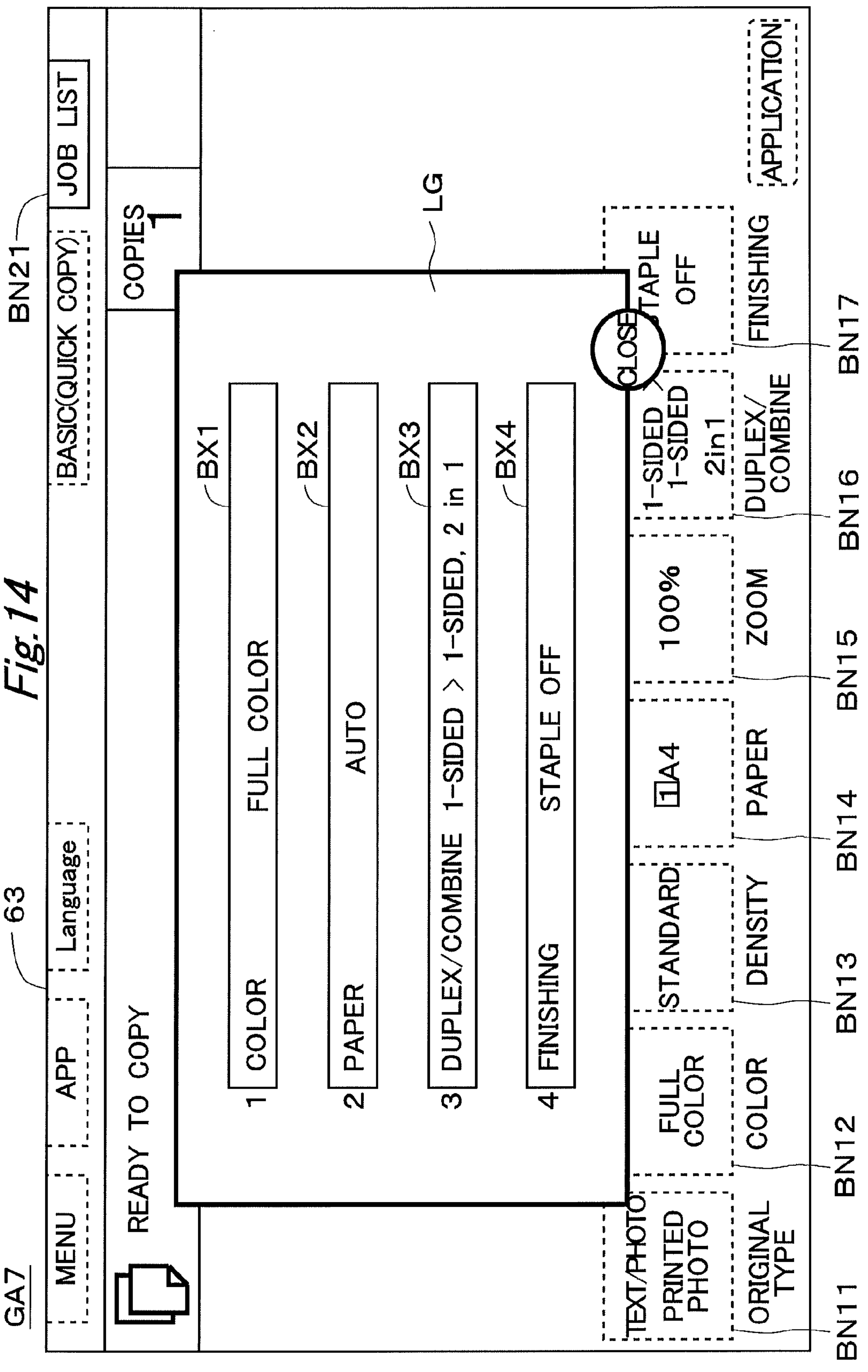
FIG. 14 is a view showing a list screen.

In the list screen LG, one or a plurality of setting details which are operated during the setting operation period TM are displayed. Specifically, as shown in FIG. 14, in the list screen LG, a set item and the detail of the set item are displayed in each of boxes BX1 to BX4. The set item "Color" and the detail "Full Color" are displayed in the box BX1, and the set item "Paper" and the detail "Auto" are displayed in the box BX2. The set item "Duplex/Combine" and the detail "1-Sided>1-Sided/2 in 1" are displayed in the box BX3, and the set item "Finishing" and the detail "Staple Off" are displayed in the box BX4. These boxes BX1 to BX4 also serve as "(virtual) buttons" which can be selectively operated (pressed) by the user.

When one of these boxes BX1 to BX4 is selected and pressed by the user, in response to the pressing operation, the display control part 12 hides the list screen LG and displays a specific setting screen SG corresponding to the specific set item which is selected by the user on the touch screen 63. When the box BX1 is selected, for example, the display control part 12 displays the setting screen SG12 (see FIG. 8) corresponding to the set item "Color" on the touch screen 63.

In the above-discussed operation, in response to the non-display instruction RC2, the job list screen JG is hid and the list screen LG on a plurality of set items which are operated during the setting operation period TM is displayed on the touch screen 63. Therefore, even when the job list screen JG is displayed and the setting operation for mode setting is interrupted, the user can easily recognize the operation(s) before the interruption of the setting operation, in the list screen LG. Further, by watching the list screen LG after the non-display instruction RC2, the user can look down at the operations to grasp the whole thereof.

Further, when one of these boxes BX1 to BX4 in the list screen LG is selected by the user, a specific setting screen SG corresponding to the specific set item which is selected by the user is displayed. With this operation, the user can easily call up the specific setting screen SG (SG12 or the like) relating to the operation performed during the setting operation period TM and easily resume the setting operation by using the specific setting screen SG.

3. Variations

Though the preferred embodiments of the present invention have been discussed above, the present invention is not limited to the above-discussed preferred embodiments, but allows various variations.

For example, though the setting screen SG17 (see FIG. 11) which is displayed last during the setting operation period TM is displayed as the information display screen IG (see Step S19 in FIG. 5) in the first preferred embodiment, this is only one exemplary case.

Specifically, the setting screen SG12 (see FIG. 8) which is displayed first during the setting operation period TM may be displayed as the information display screen IG in Step S19 of FIG. 5. In more detail, first, the display control part 12 determines the setting screen SG which is displayed first during the setting operation period TM as the information display screen IG on the basis of the information of the "Display" (display history information) recorded in the operation history information data TB1. When the set item "Color" is first recorded and "Yes" is recorded in the "Display" (display history information) as shown in FIG. 4, the display control part 12 determines the setting screen SG12 corresponding to the set item "Color" as the information display screen IG. Then, the display control part 12 hides the job list screen JG and displays the setting screen SG12 which is displayed first during the setting operation period TM as the information display screen IG on the touch screen 63.

With such an operation, in response to the non-display instruction RC2, the job list screen JG is hid and the setting screen SG12 which is displayed first during the setting operation period TM is displayed as the information display screen IG on the touch screen 63. Especially, even when the job list screen JG is displayed in response to the display instruction RC1 and the setting operation for mode setting is interrupted, the setting screen SG12 is displayed after that in response to the non-display instruction RC2. Therefore, by watching the setting screen SG12 after the non-display instruction RC2, the user can easily recognize the setting operation which is performed first during the setting operation period TM. Especially, since the setting screen SG12 is displayed on the touch screen 63 without requiring any labor (the pressing of the button BN12 or the like) of the user, the labor of the user can be reduced. Further, especially for the user who wants to perform the setting operations for mode setting in accordance with a predetermined procedure, this operation is very useful since the screen for the setting operation to be operated first during the setting operation period TM is automatically displayed.

Alternatively, in Step S19 of FIG. 5 or the like, two or more setting screens SG which are displayed during the setting operation period TM may be displayed in the order of operation during the setting operation period TM.

For example, all the setting screens (specifically, four setting screens) from the setting screen SG12 which is displayed first during the setting operation period TM to the setting screen SG17 which is displayed last, i.e., SG12 (see FIG. 8), SG14 (see FIG. 9), SG16 (see FIG. 10), and SG17 (see FIG. 11), may be displayed on the touch screen 63 in the order of display during the setting operation period TM.

In more detail, first, the display control part 12 determines the order of display of the setting screens SG during the setting operation period TM with reference to the operation history information data TB1. As shown in FIG. 4, the pieces of information are recorded in the operation history information data TB1 in the order of set items "Color", "Paper", "Duplex/Combine", and "Finishing", and "Yes" is recorded in each "Display" (display history information). The display control part 12 determines the order of the "setting screens SG12, SG14, SG16, and SG17" as the order of display during the setting operation period TM on the basis of the operation history information data TB1. Then, the display control part 12 sequentially displays the setting screens SG12, SG14, and SG16 in accordance with the order of display each for a certain time period (e.g., for 1 second) on the touch screen 63, and after that, the display control part 12 displays the setting screen SG17 (see FIG. 11) which is displayed last, on the touch screen 63.

With such an operation, since all the setting screens SG12 to SG17 from the setting screen SG12 which is displayed first during the setting operation period TM to the setting screen SG17 which is displayed last are displayed on the touch screen 63 in response to the non-display instruction RC2 in the order of display during the setting operation period TM, the user can recognize the setting screens SG12 to SG17 which are displayed during the setting operation period TM in the order of display.

Alternatively, some (two or more) setting screens among all the setting screens displayed during the setting operation period TM may be sequentially displayed. Specifically, individual setting screens SG (e.g., SG14, SG16, and SG17) from the setting screen SG (e.g., SG14) which is displayed a predetermined number (e.g., two) before the setting screen SG17 which is displayed last during the setting operation period TM to the setting screen SG17 which is displayed last may be sequentially displayed on the touch screen 63.

Further alternatively, the information display screen IG to be displayed after the job list screen JG is hid may be determined in accordance with whether or not any setting screen SG is being displayed on the touch screen 63 when the display instruction RC1 for the job list screen JG is received. Hereinafter, this variation will be discussed with reference to FIG. 15.

Figure 15:
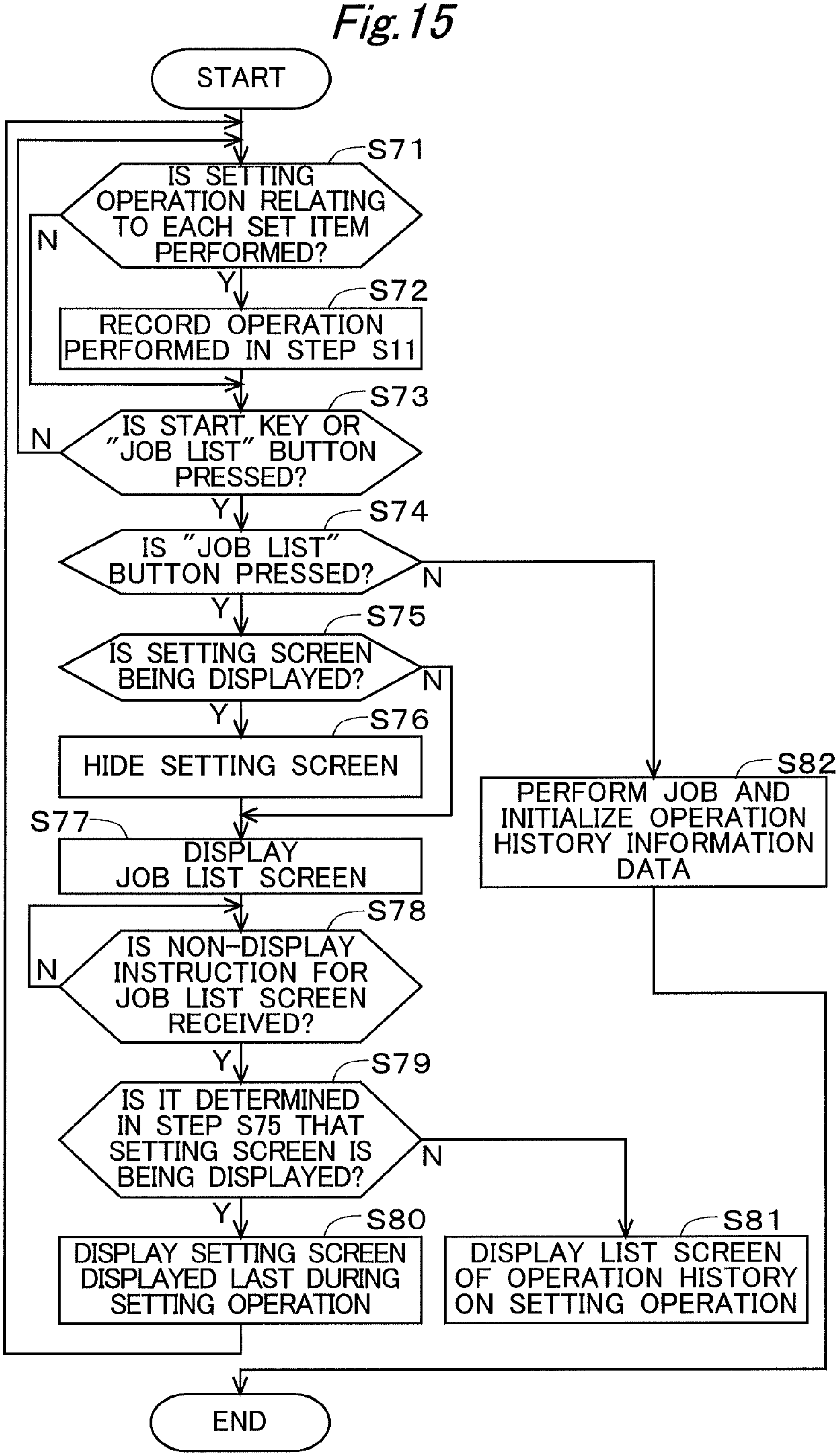
FIG. 15 is a flowchart showing an operation of the image forming apparatus in accordance with a variation.

In this variation, especially, the operations of Steps S79 to S81 of FIG. 15 are different from the operation of corresponding Step S19 (see FIG. 5) in the first preferred embodiment. In Steps S71 to S78 and Step S82 of FIG. 15, the same operations are performed as those in Steps S11 to S18 and Step S20 of FIG. 5, respectively.

Specifically, in Step S79, it is determined whether or not any setting screen SG is being displayed on the touch screen 63 when the display instruction RC1 for the job list screen JG is received. When the display instruction RC1 is received while the setting screen SG is being displayed, the process goes to Step S80, and when the display instruction RC1 is received while no setting screen SG is being displayed, the process goes to Step S81.

In Step S80, in response to the non-display instruction RC2, the display control part 12 hides the job list screen JG and displays the setting screen SG17 (see FIG. 11) which is displayed last during the setting operation period TM, as the information display screen IG on the touch screen 63.

Thus, in the case where the display instruction RC1 for the job list screen JG is received while the setting screen SG (SG17) is being displayed on the touch screen 63, when the non-display instruction RC2 for the job list screen JG is received while the job list screen JG is being displayed, the job list screen JG is hid and the setting screen SG (SG17) is displayed in response to the non-display instruction RC2.

On the other hand, in Step S81, in response to the non-display instruction RC2, the display control part 12 hides the job list screen JG and displays the list screen LG of operation history on the setting operation(s) (see FIG. 14) as the information display screen IG on the touch screen 63.

Thus, in the case where the display instruction RC1 for the job list screen JG is received while no setting screen SG is being displayed on the touch screen 63, when the non-display instruction RC2 for the job list screen JG is received while the job list screen JG is being displayed, the job list screen JG is hid and the list screen LG of operation history of the setting operation(s) is displayed in response to the non-display instruction RC2.

In such an aspect of the variation, since the setting screen SG (SG17) which was being displayed is displayed again in response to the non-display instruction RC2 in the case where the display instruction RC1 is received while the setting screen SG (SG17) is being displayed, it is possible to easily resume the setting operation using the setting screen SG On the other hand, since the list screen LG is displayed in response to the non-display instruction RC2 in the case where the display instruction RC1 is received while no setting screen SG is being displayed, the user can easily grasp the operations performed during the setting operation period TM. Further, it is also possible to easily call up the setting screen relating to the operation performed during the setting operation period TM, by using the list screen LG.

Further, though the operation history information data TB (TB1) is updated both in the cases where the setting screen SG is displayed and where the setting of mode is changed in the setting screen SG in the above-discussed preferred embodiments, this is only one exemplary case.

For example, the operation history information data TB (TB2) may be updated only in the case where the setting of mode is changed in the setting screen SG. Specifically, among the four set items ("Color", "Paper", "Duplex/Combine", and "Finishing"), only the two set items ("Color" and "Duplex/Combine") on which the setting details are changed during the setting operation period TM may be recorded into the operation history information data TB2. In this case, the history recording part 13 has only to record information of the "Set Item", the "Change of Settings" (setting change history information), and the "Setting Details" into the operation history information data TB2 and does not have to record any information of the "Display", as shown in FIG. 16.

Furthermore, the display control part 12 displays the setting screen SG17 which is displayed last during the setting operation period TM as the information display screen IG on the basis of the information of the "Display" (display history information) (see FIG. 4) recorded in the operation history information data TB1 in Step S19 of FIG. 5 in the first preferred embodiment, this is only one exemplary case.

For example, the display control part 12 may display the setting screen (referred to also as the last setting screen (in more detail, the setting screen relating to the set item changed last)) SG16 relating to the set item which is changed last during the setting operation period TM, as information display screen IG on the touch screen 63. The setting screen relating to the set item changed last may be determined and displayed on the basis of the setting change history information (information recorded in "Change of Settings", or the like) recorded in the operation history information data TB1 (see FIG. 4) or the operation history information data TB2 (see FIG. 16). With this operation, the user can easily resume the setting operation by using the setting screen SG16 relating to the set item which is changed last.

Alternatively, the display control part 12 may display the setting screen (referred to also as the first setting screen (in more detail, the setting screen relating to the set item changed first)) SG12 relating to the set item which is changed first during the setting operation period TM, as information display screen IG on the touch screen 63. The setting screen relating to the set item changed first may be determined and displayed on the basis of the setting change history information recorded in the operation history information data TB1 (see FIG. 4) or the operation history information data TB2 (see FIG. 16). With this operation, the user can easily recognize the change of setting which is performed first during the setting operation period TM by using the setting screen SG12 relating to the set item which is changed first.

Similarly, the display control part 12 may sequentially display two or more setting screens SG12 and SG16 (the setting screen S12 relating to the set item changed first and the setting screen SG16 relating to the set item changed last) relating to the set items which are changed during the setting operation period TM, on the touch screen 63 in the order of change of setting. The order of change of settings may be determined on the basis of the setting change history information recorded in the operation history information data TB1 (see FIG. 4) or the operation history information data TB2 (see FIG. 16). With this operation, the user can sequentially recognize the changes of settings which are performed during the setting operation period TM in the order of change of settings.

Further, though the idea of the present invention is applied to an image forming system formed of a single image forming apparatus 1 in the above-discussed preferred embodiments, this is only one exemplary case. The idea of the present invention may be applied to, for example, an image forming system formed of a plurality of apparatuses (e.g., a computer and a printer) as show in FIG. 17.

Figure 17:
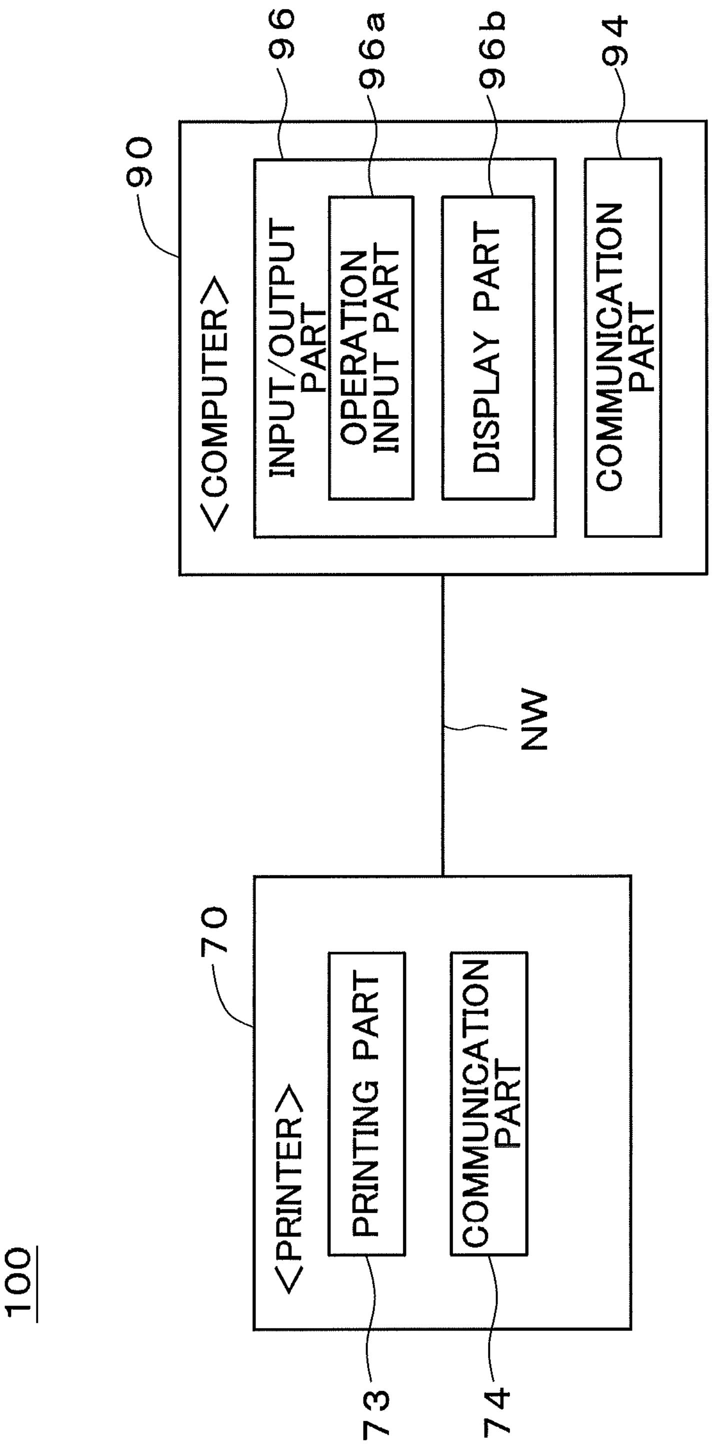
FIG. 17 is a view showing a schematic constitution of an image forming system in accordance with another variation.

FIG. 17 is a schematic view showing a constitution of an image forming system 100 in accordance with this variation. The image forming system 100 comprises a printer 70 and a computer 90.

The printer 70 is connected to the computer 90 through the network NW and can transmit and receive data to/from the computer 90. The network NW includes a LAN (Local Area Network) and various networks such as the internet.

The printer 70, especially, serves as a printing device for performing a print job from the computer 90. Specifically, the computer 90 sends a print job to the printer 70 through a printer driver (software program) PG2 or the like which is installed therein. On the other hand, the printer 70 receives the print job sent from the computer 90 and executes the print job. With this operation, the printer 70 performs a printing process.

Specifically, as shown in FIG. 17, the printer 70 comprises a printing part 73, a communication part 74, and the like. The printing part 73 and the communication part 74 are processing parts which perform the same operations as the printing part 3 and the communication part 4 of FIG. 2 do, respectively.

the computer 90 is a personal computer and comprises an input/output part 96, a communication part 94, and the like. The input/output part 96 has an operation input part 96*a* for receiving an input which is given to the computer 90 and a display part 96*b* for displaying various information thereon. For example, a keyboard, a mouse, and the like are provided as the operation input part 96*a*, and a liquid crystal display and the like are provided as the display part 96*b*. The communication part 94 is a processing part which performs the same operation as the communication part 4 of FIG. 2 does.

In the image forming system 100, the computer 90 implements the above idea by using the printer driver PG2. Specifically, the computer 90 can display a setting screen SG for mode setting relevant to the printer 70 on the display part 96*b* and display a job list screen JG on running jobs of the printer 70 on the display part 96*b*, by executing the printer driver PG2. In more detail, by executing the printer driver PG2, processing parts which are the same as the input control part 11, the display control part 12, the history recording part 13, and the like are implemented in the computer 90, and by using the processing parts 11, 12, 13, and the like, the same operations relating to the display on the display part 96*b*, and the like, as discussed in the preferred embodiments and the like are performed. The printer driver PG2 may be acquired via various portable (in other words, non-transitory) computer-readable recording media (a USB memory, a CD-ROM, or the like). Alternatively, the printer driver PG2 may be downloaded via the network or the like and installed into the computer 90.

In more detail, the computer 90 selectively displays the setting screen SG for various modes and the job list screen JG on the display part 96*b*.

When the non-display instruction RC2 for the job list screen JG is received while the job list screen JG is being displayed on the display part 96*b*, the computer 90 hides the job list screen JG and displays the information display screen IG on the display part 96*b*.

The same applies to the other operations. Relating to the display on the display part 96*b*, performed are the same operations as the above-discussed operations relating to the display on the touch screen 63.

In such an aspect of the variation, the same effect as that of the above-discussed preferred embodiments and the like can be produced.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus, comprising:
a display part; and
a processor configured to:
receive an operation input from a user;
display a setting screen for mode setting on the display part in response to said operation input, the setting screen having a plurality of setting screens that are selectively displayed during a setting operation period, each of the plurality of setting screens corresponding to a distinct mode setting;
hide each of the setting screens displayed during the setting operation period so that the setting screens are not displayed on the display part, and then display a job list screen on said display part, in response to a first instruction which is a display instruction for said job list screen received during the setting operation period for mode setting, so that each of the setting screens is not displayed on the display part while the job list screen is being displayed; and hide said job list screen and automatically display on said display part at least one of the plurality of setting screens that was hidden and not displayed on the display part by the first instruction just before the job list screen was displayed, in response to a second instruction which is a non-display instruction for said job list screen received while said job list screen is being displayed.

2. The image forming apparatus according to claim 1, wherein said processor is configured to display at least one setting screen which is used during said setting operation period, as an information display screen.

3. The image forming apparatus according to claim 2, wherein said processor is configured to display a last setting screen which is a setting screen relating to a set item changed last during said setting operation period, as said information display screen.

4. The image forming apparatus according to claim 2, wherein said processor is configured to display a first setting screen which is a setting screen displayed first during said setting operation period, as said information display screen.

5. The image forming apparatus according to claim 2, wherein said processor is configured to display a first setting screen which is a setting screen relating to a set item changed first during said setting operation period, as said information display screen.

6. The image forming apparatus according to claim 2, wherein said processor is configured to display two or more setting screens which are displayed during said setting operation period, in the order of display during said setting operation period, as said information display screen.

7. The image forming apparatus according to claim 6, wherein said processor is configured to display a plurality of setting screens from a setting screen displayed first during said setting operation period to a setting screen displayed last during said setting operation period, in the order of display during said setting operation period, as said information display screen.

8. The image forming apparatus according to claim 2, wherein said processor is configured to display two or more setting screens relating to set items which are changed during said setting operation period, in the order of change during said setting operation period, as said information display screen.

9. The image forming apparatus according to claim 8, wherein said processor is configured to display a plurality of setting screens from a setting screen relating to a set item which is changed first during said setting operation period to a setting screen relating to a set item which is changed last during said setting operation period, in the order of change during said setting operation period, as said information display screen.

10. The image forming apparatus according to claim 1, wherein said processor is configured to display a list screen of operation history on a setting operation as an information display screen.

11. The image forming apparatus according to claim 10, wherein said processor is configured to display one or a plurality of set items which are operated during said setting operation period in said list screen and displays a specific setting screen corresponding to a specific set item selected out of said one or plurality of set items by said user on said display part.

12. The image forming apparatus according to claim 1, wherein said processor is configured to hide said job list screen and displays a last setting screen as said information display screen in response to said second instruction when said second instruction is received while said job list screen is being displayed in a case where said first instruction is received while said last setting screen is being displayed on said display part, and said processor is configured to display a list screen of operation history on a setting operation as said information display screen in response to said second instruction when said second instruction is received while said job list screen is being displayed in a case where said first instruction is received while said last setting screen is not being displayed on said display part.

13. The image forming apparatus according to claim 1, further comprising:

a storage part for storing history information relating to an operation which is performed during said setting operation period as operation history information, wherein said processor is configured to determine said setting screen on the basis of said operation history information when said second instruction is received.

14. The image forming apparatus according to claim 13, wherein said storage part records setting change history information in said setting operation period as said operation history information, and said processor is configured to display at least one setting screen on which a change of setting is performed during said setting operation period, on the basis of said setting change history information, as said information display screen on said display part.

15. The image forming apparatus according to claim 13, wherein said storage part records display history information of a setting screen displayed on said display part during said setting operation period as said operation history information, and said processor is configured to display at least one setting screen displayed during said setting operation period, on the basis of said setting change history information, as said information display screen on said display part.

16. A non-transitory computer-readable recording medium recording therein a computer program for causing a computer to serve as a device comprising:

a display part; and a processor configured to:

receive an operation input from a user;

display a setting screen for mode setting in an image forming apparatus on the display part in response to said operation input, the setting screen having a plurality of setting screens that are selectively displayed during a setting operation period, each of the plurality of setting screens corresponding to a distinct mode setting;

hide each of the setting screens displayed during the setting operation period so that the setting screens are not displayed on the display part, and then display a job list screen on said display part, in response to a display instruction for said job list screen received during the setting operation period for mode setting, so that each of the setting screens is not displayed on the display part while the job list screen is being displayed, and hide said job list screen and automatically display on said display part at least one of the plurality of setting screens that was hidden and not displayed on the display part by the display instruction just before the job list screen was displayed in response to a non-display instruction for said job list screen received while said job list screen is being displayed.

* * * * *